US012641236B2

(12) United States Patent
Xu et al.

(10) Patent No.: US 12,641,236 B2
(45) Date of Patent: May 26, 2026

(54) STATE MACHINE-BASED QUANTIZATION SHIFTING OFFSET FOR VIDEO AND IMAGE COMPRESSION

(71) Applicant: Tencent America LLC, Palo Alto, CA (US)

(72) Inventors: Motong Xu, Palo Alto, CA (US); Roman Chernyak, Santa Clara, CA (US); Lien-Fei Chen, Palo Alto, CA (US); Biao Wang, San Jose, CA (US); Yonguk Yoon, Palo Alto, CA (US); Xin Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 43 days.

(21) Appl. No.: 18/913,887

(22) Filed: Oct. 11, 2024

(65) Prior Publication Data

US 2025/0133210 A1    Apr. 24, 2025

Related U.S. Application Data

(60) Provisional application No. 63/544,938, filed on Oct. 19, 2023.

(51) Int. Cl.
| | |
|---|---|
| *H04N 19/126* | (2014.01) |
| *H04N 19/176* | (2014.01) |
| *H04N 19/18* | (2014.01) |

(52) U.S. Cl.
CPC ......... *H04N 19/126* (2014.11); *H04N 19/176* (2014.11); *H04N 19/18* (2014.11)

(58) Field of Classification Search
CPC ..... H04N 19/18; H04N 19/126; H04N 19/176
See application file for complete search history.

(56) References Cited

U.S. PATENT DOCUMENTS

| | | | | |
|---|---|---|---|---|
| 2003/0156652 A1* | 8/2003 | Wise | .............. | G06F 13/16 |
| | | | | 711/E12.003 |
| 2017/0310999 A1* | 10/2017 | Hebel | ............... | H04N 19/13 |
| 2022/0086488 A1* | 3/2022 | Hu | .............. | H04N 19/46 |
| 2022/0217418 A1* | 7/2022 | Schwarz | ......... | H04N 19/18 |
| 2022/0321886 A1* | 10/2022 | Schwarz | ......... | H04N 19/70 |

* cited by examiner

*Primary Examiner* — Zhubing Ren
(74) *Attorney, Agent, or Firm* — ARENTFOX SCHIFF LLP

(57) ABSTRACT

A method includes receiving a bitstream that comprises coded information of a current block, the coded information of the current block indicates a state transition path of a state machine, the state transition path of the state machine includes at least a first state transition associated with a first quantization shifting offset of one or more first transform coefficients in transform coefficients of the current block. The method also includes determining the first quantization shifting offset associated with the one or more first transform coefficients according to the first state transition; reconstructing the one or more first transform coefficients based on the first quantization shifting offset; calculating residuals in a spatial domain of the current block based on at least the one or more first transform coefficients; and reconstructing the current block according to the residuals in the spatial domain.

20 Claims, 9 Drawing Sheets

STATE MACHINE-BASED QUANTIZATION SHIFTING OFFSET FOR VIDEO AND IMAGE COMPRESSION

INCORPORATION BY REFERENCE

The present application claims the benefit of priority to U.S. Provisional Application No. 63/544,938, "STATE MACHINE-BASED QUANTIZATION SHIFTING OFFSET FOR VIDEO AND IMAGE COMPRESSION" filed on Oct. 19, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods and apparatuses for video encoding/decoding. In some examples, an apparatus for video encoding/decoding includes processing circuitry.

Some aspects of the disclosure provide a method of video decoding. The method includes receiving a bitstream that comprises coded information of a current block, the coded information of the current block indicates a state transition path of a state machine, the state transition path of the state machine includes at least a first state transition associated with a first quantization shifting offset of one or more first transform coefficients in transform coefficients of the current block. The method also includes determining the first quantization shifting offset associated with the one or more first transform coefficients according to the first state transition; reconstructing the one or more first transform coefficients based on the first quantization shifting offset; calculating residuals in a spatial domain of the current block based on at least the one or more first transform coefficients; and reconstructing the current block according to the residuals in the spatial domain.

Some aspects of the disclosure provide a method of video encoding. The method includes determining a state transition path of a state machine based on a current block, the state transition path includes at least a first state transition associated with a first quantization shifting offset of one or more first transform coefficients in transform coefficients of the current block. The method also includes determining the first quantization shifting offset associated with the one or more first transform coefficients based on the first state transition; reconstructing the one or more first transform coefficients based on the first quantization shifting offset; calculating residuals in a spatial domain of the current block based on at least the one or more first transform coefficients; reconstructing the current block according to the residuals in the spatial domain; and encoding the current block as coded information in a bitstream, the coded information being indicative of the state transition path.

Aspects of the disclosure also provide an apparatus for video encoding/decoding.

Aspects of the disclosure also provide a method for processing visual media data. In the method, a bitstream of visual media data is processed according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder. In an example, the bitstream includes coded information of a current block, the coded information of the current block in a current picture indicates a state transition path of a state machine, the state transition path of the state machine includes at least a first state transition associated with a first quantization shifting offset of one or more first transform coefficients in transform coefficients of the current block. The format rule specifies that: the first quantization shifting offset associated with the one or more first transform coefficients is determined according to the first state transition; the one or more first transform coefficients are reconstructed based on the first quantization shifting offset; residuals in a spatial domain of the current block are calculated based on at least the one or more first transform coefficients; and the current block is reconstructed according to the residuals in the spatial domain.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
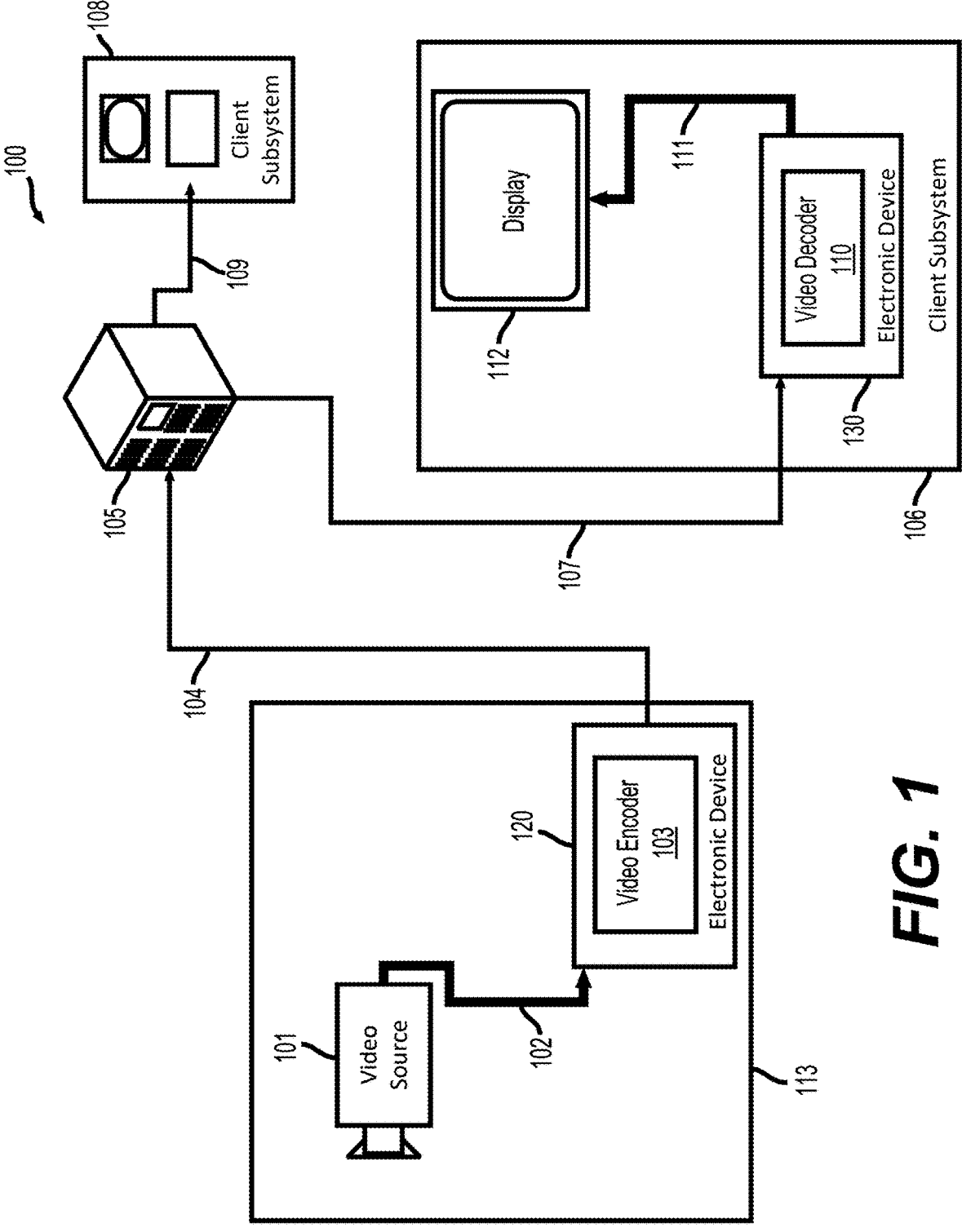
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
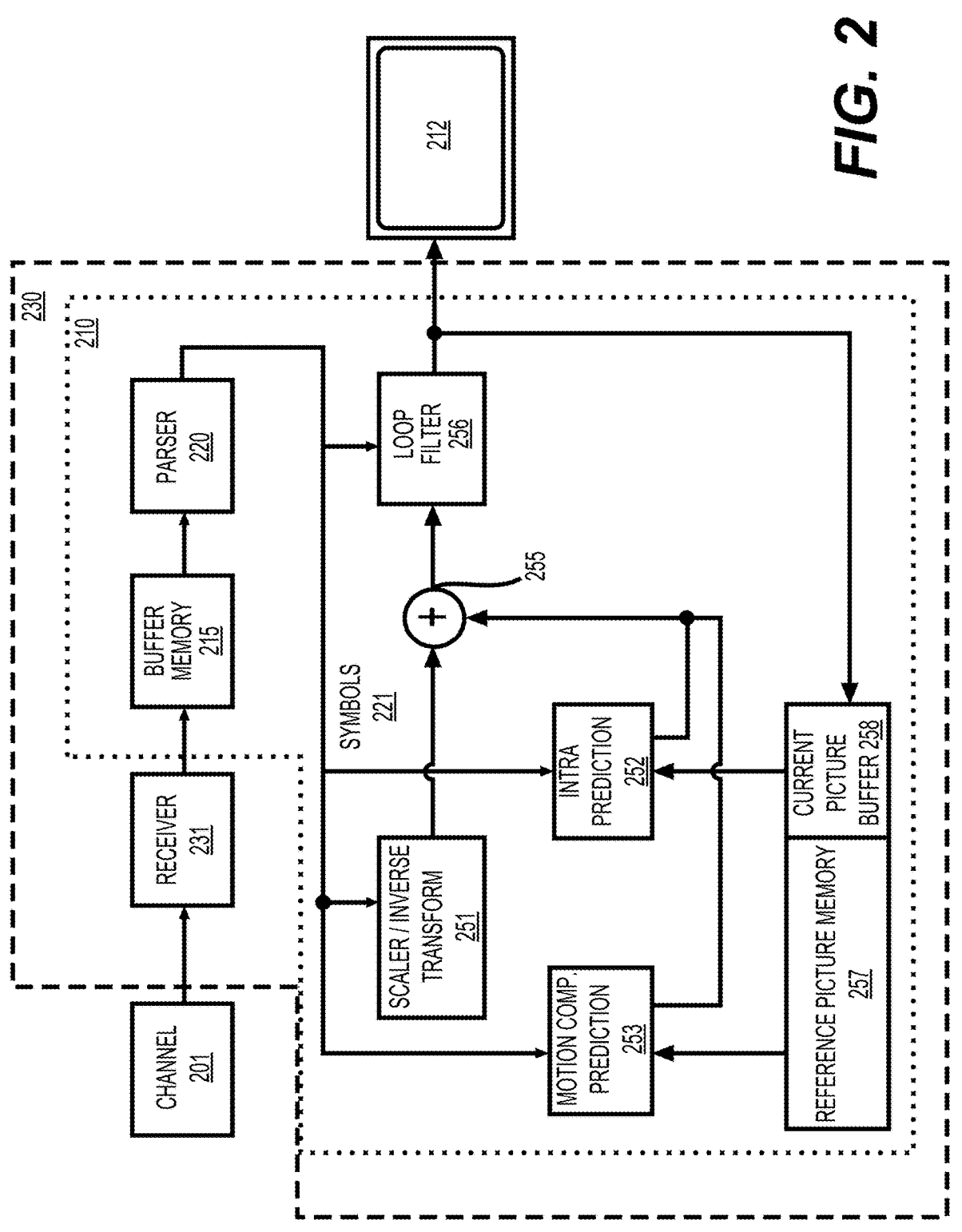
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
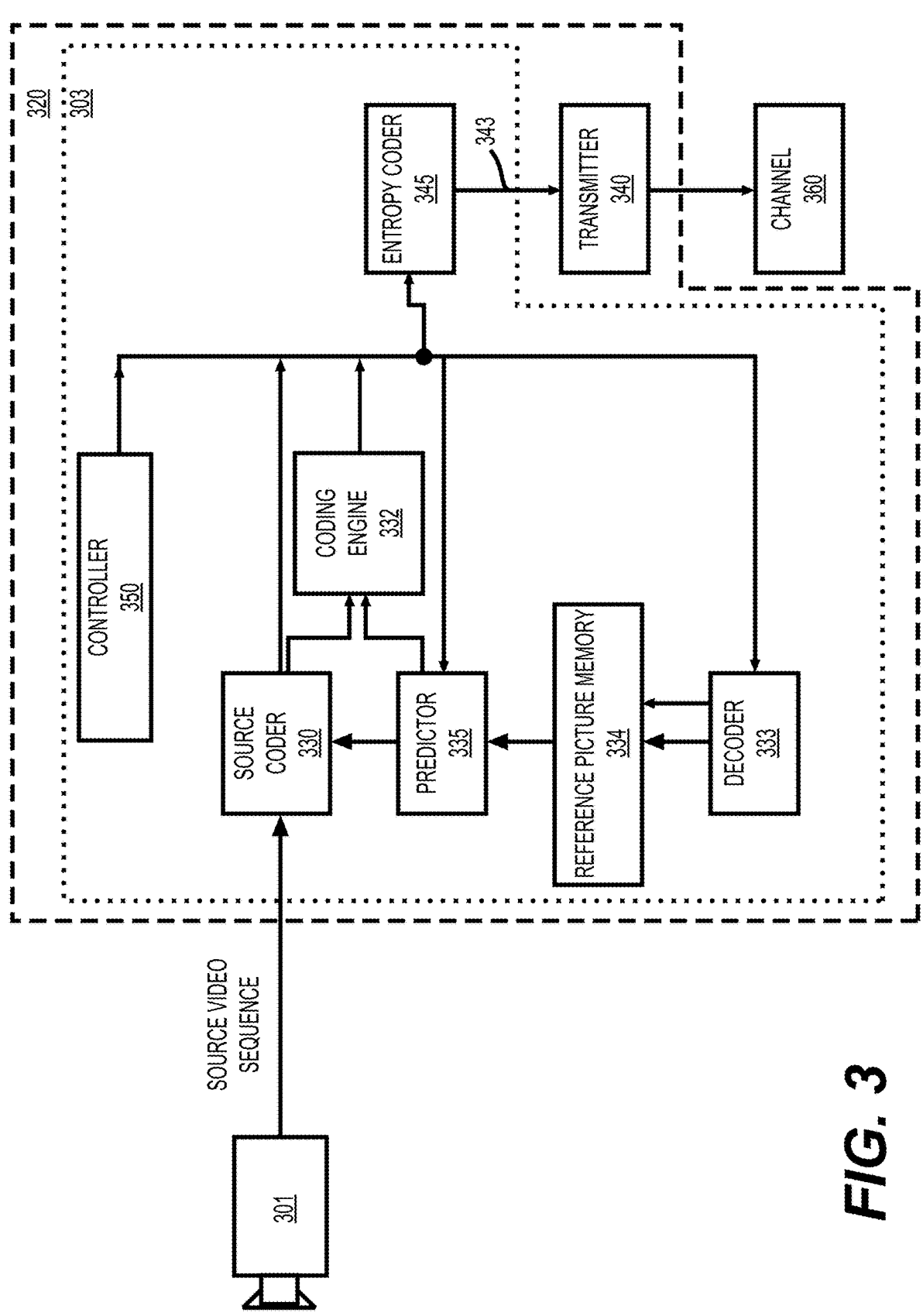
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303)

with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some examples, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Aspects of the disclosure provide techniques for adapting the quantizer center shifting offset (also referred to as quantization shifting offset) for image and video coding. In some examples, the techniques can perform a state machine-based shifting offset selection for quantizer center shifting, and can improve the compression efficiency.

In video codec, techniques, such as transform, quantization, and the like are used to reduce redundancy in video signals. For example, transform techniques can reduce redundancy in the video signal by decorrelation, and quantization techniques can decrease the data of the transform coefficient representation by reducing precision, for example by removing imperceptible details, and thus reducing irrelevance in the data.

In some examples, transformation decorrelates a signal by transforming the signal from the spatial domain to a transform domain (e.g., a frequency domain), using a suitable transform basis. For example, a transform is applied to the prediction residual (regardless of whether it comes from inter- or intra-picture prediction), that is, the difference between the prediction and the original input video signal. In the transform domain, the essential information typically concentrates into a small number of coefficients. At the decoder, the inverse transform can be applied to reconstruct the residual samples.

Generally, quantization is used to reduce the precision of an input value or a set of input values in order to decrease the amount of data needed to represent the values. In some examples, the quantization is typically applied to individual transformed residual samples (e.g., transform coefficients), resulting in integer coefficient levels. The transform process is applied at the encoder. At the decoder, the corresponding process is known as inverse quantization (also referred to as dequantization), which restores the original value range without regaining the precision.

In some related video and image codecs, a quantization shifting offset $\rho^*$ that is predefined can be applied on the dequantized values at the decoder side. In some examples, the quantization shifting offset $\rho^*$ can be used to control a quantization dead zone.

In some related examples, at the decoder side, the reconstructed transform coefficient value $y_i$ is generated by shifting the dequantized values $dq_i$ (e.g., result from inverse quantization) within a dequantized block (in the transform domain also referred to as frequency domain) with the predefined quantization shifting offset $\rho^*$, such as according to Eq. (1):

$$\begin{cases} y_i \leftarrow dq_i + \rho^* & \text{when } dq_i > 0 \\ y_i \leftarrow dq_i - \rho^* & \text{when } dq_i < 0, \text{ for } i = 1 ..n \\ y_i \leftarrow dq_i & \text{when } dq_i > 0 \end{cases} \qquad \text{Eq. (1)}$$

Some aspects of the disclosure provide the techniques of a state machine based shifting offset selection for quantizer center shifting (also referred to as quantization shifting offset), and can improve the compression efficiency.

In some examples (e.g., VVC), dependent quantization (DQ) also referred to as trellis coded quantization (TCQ) is performed based on a state machine. DQ utilizes the correlation between digits to reduce the bit rate and employs suitable algorithm to select the optimal quantization value. In some examples, the DQ uses a trellis structure along a scanning order of transform coefficients and finds a path in the trellis structure with the smallest cost. For example, the coded output for a group of samples with the smallest cost measured by MSE and number of bits for signaling can be found according to the trellis structure.

In some examples, the trellis structure of DQ is based on even-odd quantizer. For example, two quantizers Q0 (e.g., also referred to as even quantizer) and Q1 (e.g., also referred to as odd quantizer) are used. The even quantizer Q0 quantizes even multiples such as 0, 2, 4, 6, etc., and the odd quantizer Q1 quantizes odd multiples such as 0, 1, 3, 5, 7, etc. Both quantizers include 0 as a special value.

In an example, the reconstruction levels for the even quantizer Q0 are calculated by the even integer multiples of the quantization step size $\Delta$ (e.g., $-8\Delta$, $-6\Delta$, $-4\Delta$, $-2\Delta$, 0, 2$\Delta$, 4$\Delta$, 6$\Delta$, 8$\Delta$). When the even quantizer Q0 is used, a reconstructed transform coefficient t' is calculated according to Eq. (2):

$$t' = 2 \cdot k \cdot \Delta, \, k = \{\dots, -4, -3, -2, -1, 0, 1, 2, 3, 4, \dots\} \qquad \text{Eq. (2)}$$

where k denotes the associated transform coefficient level (e.g., indicated by a transmitted quantization index).

In an example, the reconstruction levels of the odd quantizer Q1 are given by the odd integer multiples of the quantization step size $\Delta$ and, in addition, the odd quantizer Q1 also includes the reconstruction level equal to zero. For example, when the odd quantizer is used, the reconstructed transform coefficients t' is calculated according to Eq. (3):

$$t' = (2 \cdot k - \text{sgn}(k)) \cdot \Delta, \qquad \text{Eq. (3)}$$

$$k = \{\dots, -5, -4, -3, -2, -1, 0, 1, 2, 3, 4, 5, \dots\}$$

where sgn($\cdot$) denotes the signum function sgn(x)=(x==0?0: (x<0?−1:1)).

In some examples, the trellis structure is implemented by a state machine of 4 states. The DQ calculates the reconstruction value of a transform coefficient depending on the quantized transform coefficient value and the quantizer used for reconstruction of the transform coefficient that precedes the current one (state based coefficient reconstruction) in reconstruction order (e.g., corresponding to the scanning order of the trellis structure). In some examples, the quantizer used (Q0 or Q1) of the current transform coefficient is not explicated signaled in the bitstream, and can be determined by the parities of the transform coefficient levels that precede the current transform coefficient in coding/reconstruction order (e.g., also referred to as scanning order). Switching of the quantizer is implemented by defining a state transition machine (or a state machine) where the state transition direction at each state depends on the quantized transform coefficient value.

Figures 4, 5:
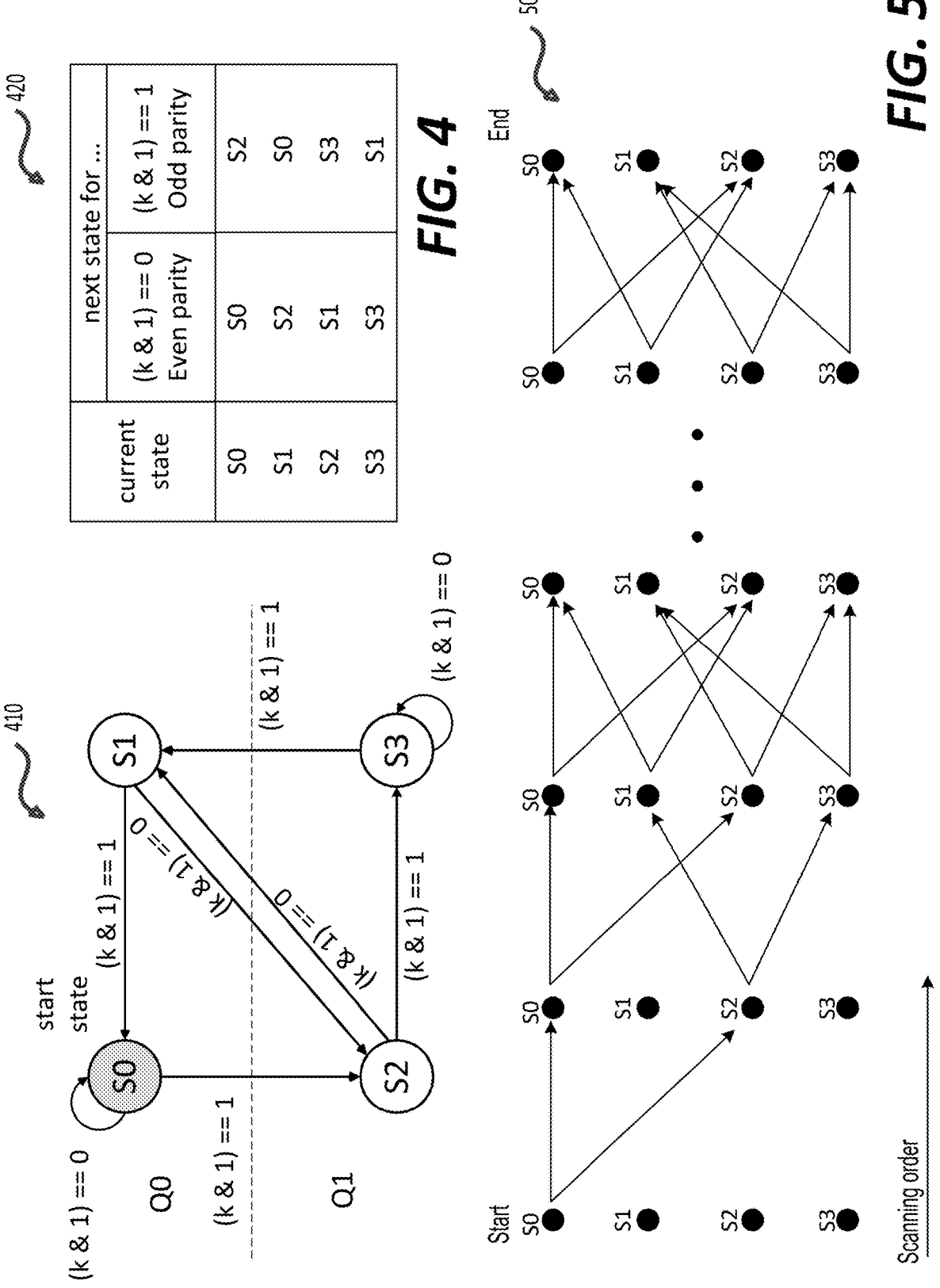
FIG. 4 shows a diagram of a state machine in some examples.
FIG. 5 shows a trellis structure in some examples.

FIG. 4 shows a diagram of a state machine (410), and a transition table (420) for the state machine (410) in some examples, and FIG. 5 shows a trellis structure (500) based on the state machine (410) in some examples. The state machine (410) includes four states, S0, S1, S2 and S3. The transitions of the states are based on the parity of the coding bits (e.g., parity of k values, k is the quantized transform coefficient value). Further, the state transition direction at one state depends on the parity of the quantized transform coefficient, and the quantizer (Q0 or Q1) used for reconstruction depends on the previous state index value.

In the FIG. 4 example, the states S0 and S1 are associated with even quantizer Q0 and the states S2 and S3 are associated with odd quantizer Q1. The operation initially starts with S0 and the even quantizer Q0 is used to quantize a current coefficient value.

For S0, the even quantizer Q0 is used. When the resulting quantization index has an even parity (i.e., k&1=0), the next state is still S0 and even quantizer Q0 is used for the next transform coefficient; when the resulting quantization index has an odd parity (i.e., k&1=1), the next state is S2 and the odd quantizer Q1 is used for the next transform coefficient.

For S1, the even quantizer Q0 is used. When the resulting quantization index has an even parity (i.e., k&1=0), the next state is S2 and the odd quantizer Q1 is used for the next transform coefficient; when the resulting quantization index has an odd parity (i.e., k&1=1), the next state is S0, the even quantizer Q0 is used for the next transform coefficient.

For S2, the odd quantizer Q1 is used. When the resulting quantization index has an even parity (i.e., k&1=0), the next state is S1 and the even quantizer Q0 is used for the next transform coefficient; when the resulting quantization index has an odd parity (i.e., k&1=1), the next state is S3 and the odd quantizer Q1 is used for the next transform coefficient.

For S3, the odd quantizer Q1 is used. When the resulting quantization index has an even parity (i.e., k&1=0), the next state is S3 and the odd quantizer Q1 is used for the next transform coefficient; when the resulting quantization index has an odd parity (i.e., k&1=1), the next state is S1 and even quantizer Q0 is used for the next transform coefficient.

In some examples, the quantization process for the transform coefficients can be represented by a trellis structure with the states defined, such as the trellis structure (500) in FIG. 5. The trellis structure includes stages corresponding to transform coefficients according to a predefined scanning order. The encoder can traverse through the trellis structure using a suitable algorithm, such as the Viterbi algorithm (also known as dynamic programming), to determine a best path of states for the group of transform coefficients. The best path indicates the determined quantization information (e.g., coded bits of quantized transform coefficient values) for the group of transform coefficients.

It is noted that, in some examples (e.g., ECM), DQ with 8 states are used. For example, states 0-7 are used. In an example, the even states (e.g., 0, 2, 4 and 6) can use an even quantizer Q0, and the odd states (e.g., 1, 3, 5 and 7) can use an odd quantizer Q1.

According to some aspects of the disclosure, the quantization shifting offset value $\rho^*$ for each non-zero transform coefficient or for some subset of all non-zero transform coefficients is decided based on a state machine. The state machine can be the same state machine for the quantization of the transform coefficients or can be a different state machine. For example, a state transition path of the state machine includes at least a first state transition associated with a first quantization shifting offset of one or more first transform coefficients in transform coefficients of the current block. Encoder/decoder can determine the first quantization shifting offset associated with the one or more first transform coefficients according to the first state transition, and reconstruct the one or more first transform coefficients based on the first quantization shifting offset. Further, encoder/decoder can calculate residuals in a spatial domain of the current block based on at least the one or more first transform coefficients; and reconstruct the current block according to the residuals in the spatial domain.

In some embodiments, the state machine that is used for the quantization shifting offsets determining is an extension of the existing state machine that is used during the quantization process. Thus, the same state machine that is used for determining the quantized transform coefficient levels is also used for determining the quantization shifting offset(s).

In some examples, the quantization shifting offsets are obtained according to the state transition direction, such as according to state index of the previous stage, and the like. For example, the quantization shifting offset for a current stage (e.g., a current transform coefficient) are obtained according to Eq. (4):

$$\rho^* = f(stateID) \qquad \text{Eq. (4)}$$

where f(·) indicates a function to calculate the quantization shifting offset of a current transform coefficient, and stateID is the previous state index (e.g., for a previous transform coefficient in the scanning order).

In an example, the quantization shifting offset is calculated according to Eq. (5):

$$\rho^* = c \cdot \text{mod}(stateID, b) \qquad \text{Eq. (5)}$$

where c is a constant value that is predefined or signaled in the bitstream at a suitable level, such as at sequence level, at picture level, at slice level, at tile level, at block level, at transform coefficient level and the like, b is a positive integer, and mod(·) is the modulo operation.

In some embodiments, the absolute value of the quantization shifting offset value a is predefined or signaled in the bitstream at a suitable level, such as at sequence level, at picture level, at slice level, at tile level, at block level, at transform coefficient level and the like. The sign of the quantization shifting offset for each non-zero coefficient or for some subset of all non-zero coefficients is obtained according to the state transition direction.

In an example, the number of states is n and the state indices are from 0 to n−1. The quantization shifting offset $\rho^*$ is obtained according to Eq. (6):

$$\rho^* = \begin{cases} a, & stateID < n/2 \\ -a, & \text{otherwise} \end{cases}, \qquad \text{(Eq. 6)}$$

Figure 6:
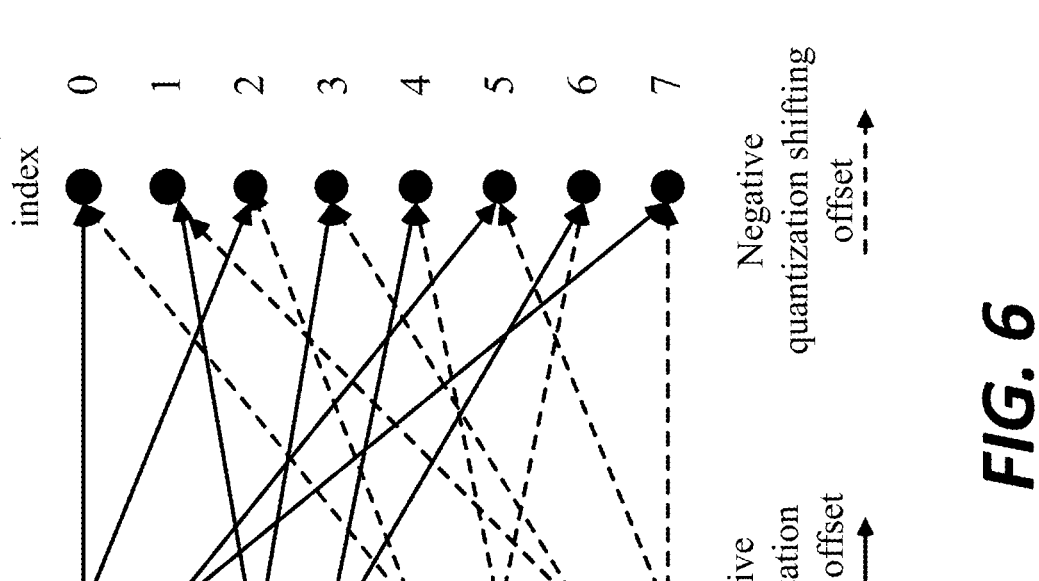
FIG. 6 shows a diagram of state machine transition between two stages according to a trellis structure in some examples.

FIG. 6 shows a diagram of state machine transition between two stages (e.g., stage (i-1) and stage (i)) according to the trellis structure in some examples. The state machine includes 8 states (0 to 7) and can be used to determine the quantized transform coefficients or can be used for transform coefficients reconstructions. The possible state transitions between two stages are represented by arrow lines. In the FIG. 6 example, the quantization shifting offset is determined according to Eq. (6). The sign of the quantization shifting offset for the transform coefficient at stage (i) is determined according to the state transition direction, such as according to the state index at the stage (i-1).

In another example, the number of states is n. A positive shifting offset $\rho^*=a$ is used for reconstruction when the previous state index is odd. Otherwise (when the previous state index is even), a negative shifting offset $\rho^*=-a$ is used for reconstruction.

Figure 7:
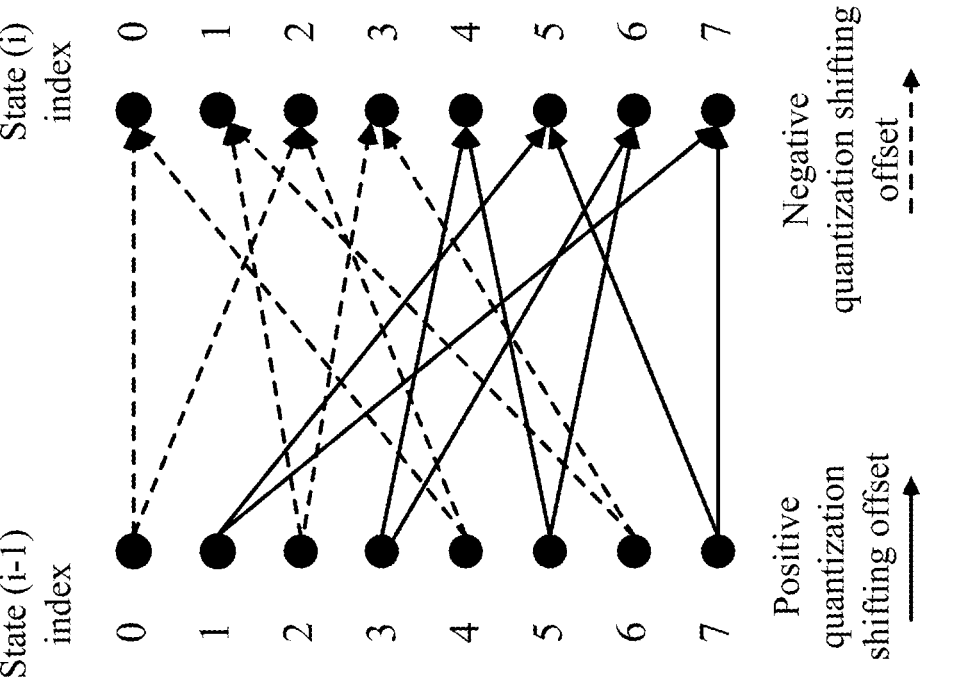
FIG. 7 shows a diagram of state machine transition between two stages according to a trellis structure in some examples.

FIG. 7 shows a diagram of state machine transition between two stages (e.g., stage (i−1) and stage (i)) according to the trellis structure in some examples. The state machine includes 8 states (0 to 7) and can be used to determine the quantized transform coefficients or can be used for transform coefficients reconstructions. The possible state transitions between two stages are represented by arrow lines. In the FIG. 7 example, when the previous state index is odd, positive quantization shifting offset is determined and used; and when the previous stage index is even, negative quantization shifting offset is determined and used.

Figure 8:
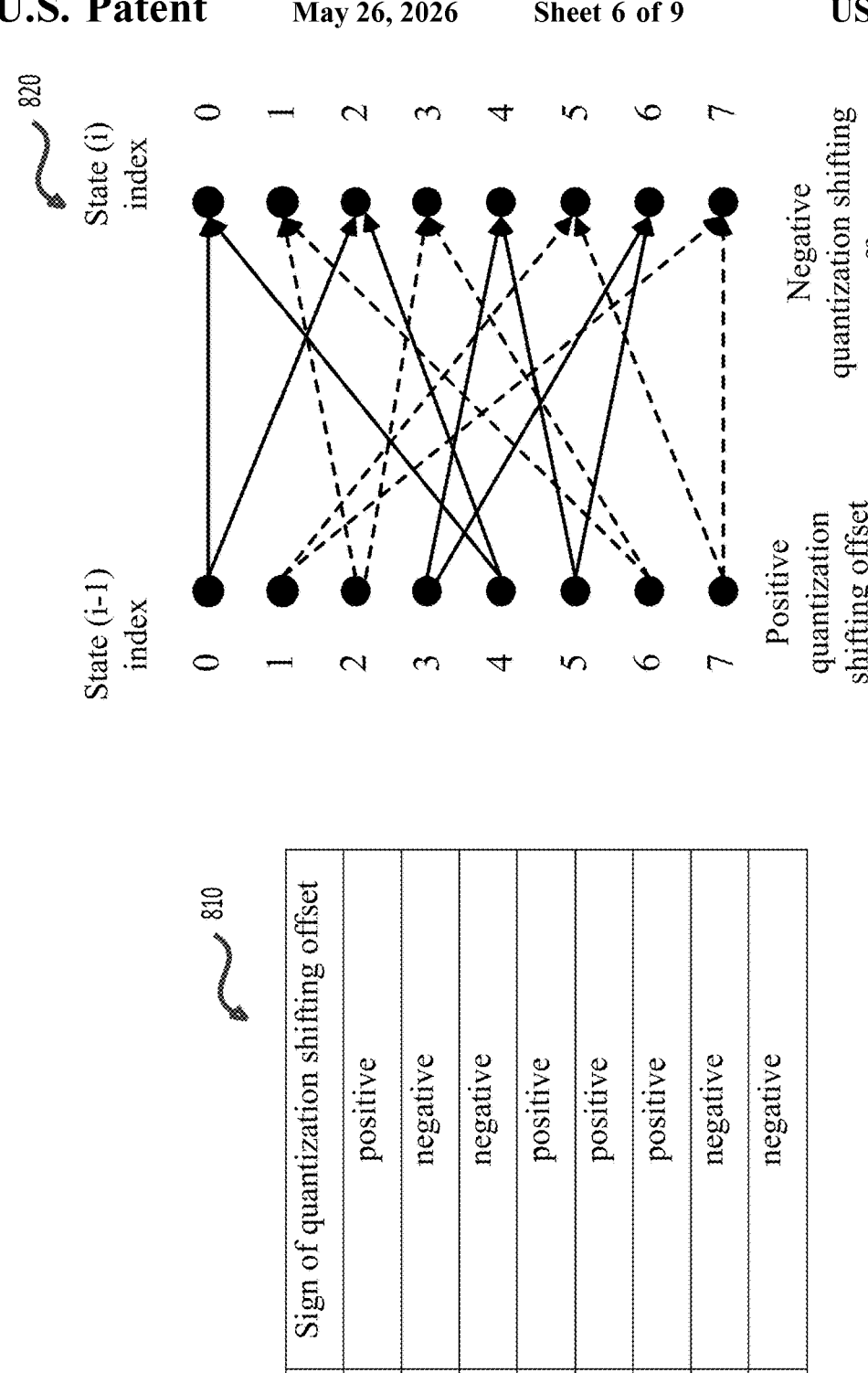
FIG. 8 shows a lookup table and a diagram of state machine transition between two stages according to the lookup table in some examples.

In another example, a lookup table is employed to indicate a mapping between the previous state indices at the previous stage and the signs of the quantization shifting offset at the current stage. FIG. 8 shows a lookup table (810) and a diagram (820) of state machine transition between two stages (e.g., stage (i−1) and stage (i)) according to the trellis structure in some examples. The state machine includes 8 states (0 to 7) and can be used to determine the quantized transform coefficients or can be used for transform coefficients reconstructions. The possible state transitions between two stages are represented by arrow lines. When the previous state index is one of 0, 3, 4, 5, a positive shifting offset $\rho^*=a$ is used; and when the previous stage index is one of 1, 2, 6, and 7, a negative shifting offset $\rho^*=-a$ is used. It is noted that in an example, a lookup table can only indicate a positive shifting offset is used when the previous state index equals 0, 3, 4 or 5; and in another example, a lookup table can only indicate a negative shifting offset is used when the previous state index equals 1, 2, 6 or 7.

In some embodiments, a quantization shifting offset candidate list is predefined, and the quantization shifting offset value used for each non-zero coefficient or for some subset of all non-zero coefficients is selected from the candidate list based on the state transition direction (e.g., the previous state index).

In some examples, the quantization shifting offset candidate list is $\{a_0, a_1\}$. The number of states is n and the previous state index stateID is an integer varies from 0 to n−1. In an example, the quantization shifting offset $\rho^*$ is obtained according to Eq. (7):

$$\rho^* = \begin{cases} a_0, \; stateID < n/2 \\ a_1, \; \text{otherwise} \end{cases} \qquad \text{Eq. (7)}$$

In some examples, the quantization shifting offset candidate list is $\{a_0, a_1\}$. The number of states is n. The quantization shifting offset is decided based on the parity of the previous state index.

In an example, $a_0$ is used for reconstruction when the previous state index is odd. Otherwise (when the previous state index is even), quantization shifting offset $a_1$ is used for reconstruction.

In some examples, the number of states is n, and the quantization shifting offset candidate list is $\{a_0, a_1 \ldots, a_k\}$, where k<n. A lookup table is employed to map the previous state index values to the quantization shifting offset values in the quantization shifting offset candidate list.

In some embodiments, a set of quantization shifting offset candidate lists can be predefined, and an index of a selected quantization shifting offset candidate list within the set is signaled in the bitstream at a suitable level, such as at sequence level, at picture level, at slice level, at tile level, at block level, at transform coefficient level and the like. For example, one or more additional syntax elements can be used to represent the selected quantization shifting offset candidate list in the bitstream. The quantization shifting offset value for each non-zero coefficient or for some subset of all non-zero coefficients is decided based on the index of the selected quantization shifting offset candidate list and the state transition direction (e.g., the previous state index).

In some examples, the signaled (selected) quantization shifting offset candidate list is $\{a_0, a_1\}$. The number of states is n and the previous state index stateID is an integer varies from 0 to n−1. The quantization shifting offset $\rho^*$ is obtained according to Eq. (8):

$$\rho^* = \begin{cases} a_0, \; stateID < n/2 \\ a_1, \; \text{otherwise} \end{cases} \qquad \text{Eq. (8)}$$

In some examples, the signaled (selected) quantization shifting offset candidate list is $\{a_0, a_1\}$. The number of states is n. The shifting offset is decided based on the parity of the previous state index.

In an example, $\rho=a_0$ is used for reconstruction when the previous state index is odd. Otherwise (when the previous state index is even), shifting offset $\rho^*=a_1$ is used for reconstruction.

In another example, the number of states is n, the signaled (selected) quantization shifting offset candidate list is $\{a_0, a_1 \ldots, a_k\}$, where k<n. A lookup table is employed to map the previous state index values to the quantization shifting offset values in the selected quantization shifting offset candidate list.

According to another aspect of the disclosure, the state machine that is used for determining the quantization shifting offsets is a second state machine with m states that is different from the state machine (also referred to as a first state machine) that is used for quantization (e.g., coding the quantized value of the transform coefficients and/or reconstructing the transform coefficients). The second state machine is used to derive the quantization shifting offset value $\rho^*$ for each non-zero transform coefficient or for some subset of all non-zero transform coefficients after the quantization process (by the first state machine). In some examples, the state transition of the second state machine depends on the existing coefficient feature (parity, value range, etc.) at the decoder side (e.g., information from reconstruction results of the first state machine). The quantization shifting offset used for transform coefficients depends on the state transition direction of the second state machine.

In some embodiments, the accumulated reconstruction error after applying the quantization shifting offset is calculated respectively for different paths in the second state machine. The index of the path that minimizes the accumulated reconstruction error is signaled in the bitstream at block level. In an example, the encoder can use the first state machine for quantization. After the quantization, the second state machine is used by the encoder to determine a quantization shifting offset for a transform coefficient or a subset of all non-zero transform coefficients. It is noted that a trellis structure can be used to determine multiple quantization shifting offsets for different transform coefficients or for different subset of transform coefficients. For example, for determining the quantization shifting offset at a stage, m states are used, then m different paths exist in the stage. The accumulated reconstruction error after applying the quantization shifting offset is calculated (e.g., using reconstruction information from the first state machine) respectively for the m different paths in the second state machine. The index of the path that minimizes the accumulated reconstruction error is signaled in the bitstream at block level.

In some embodiments, several predefined cases are included as additional paths. The index of the path that minimizes the accumulated reconstruction error is signaled in the bitstream at the block level.

In some examples, the case where quantization shifting is not applied for all transform coefficients in a block (e.g., zero quantization shifting offset) is included as an additional path.

In some examples, the case where the quantization shifting offset equals a for all transform coefficients in a block is included as an additional path.

Figure 9:
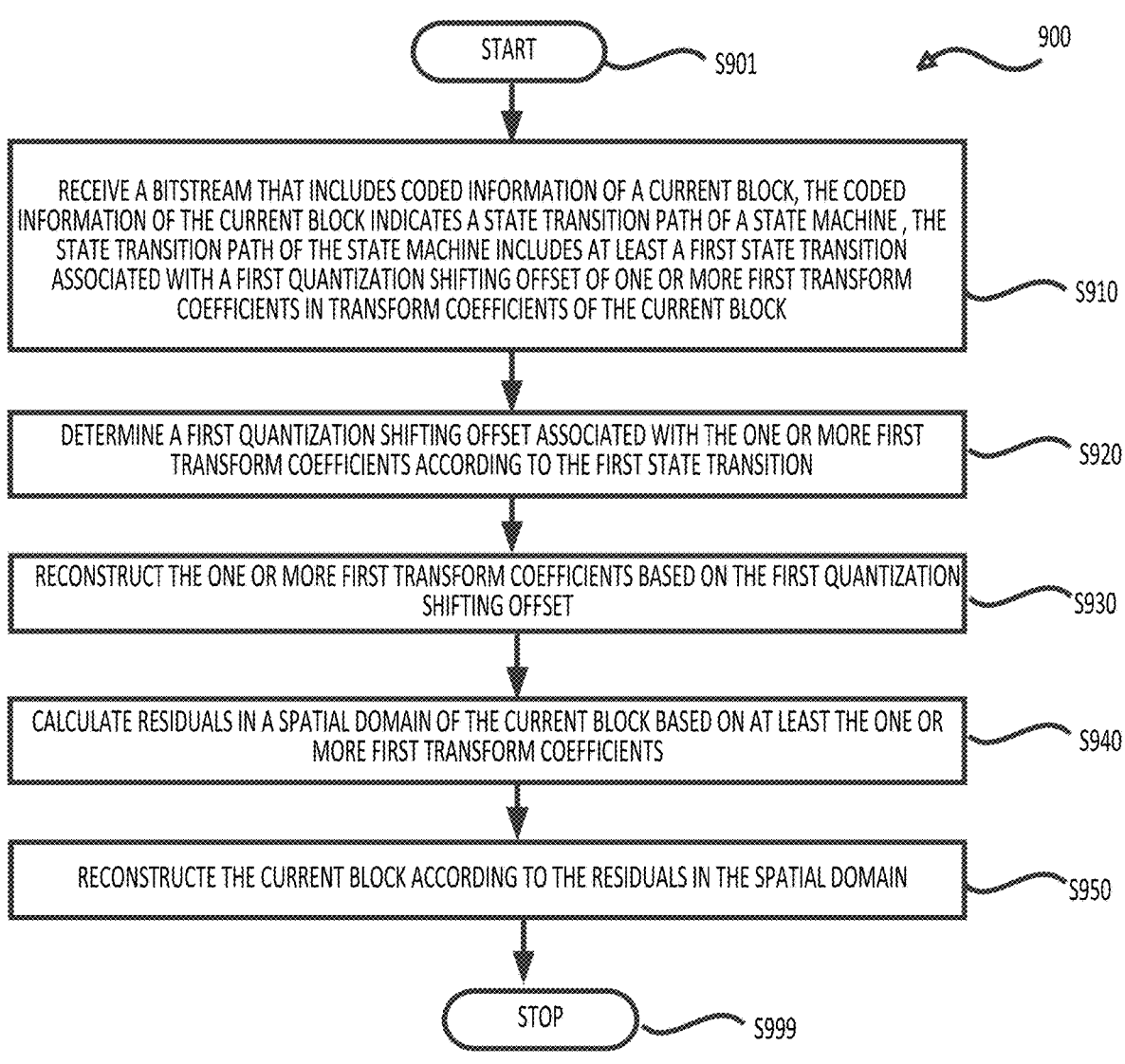
FIG. 9 shows a flow chart outlining a decoding process according to some aspects of the disclosure.

FIG. 9 shows a flow chart outlining a process (900) according to an aspect of the disclosure. The process (900) can be used in a video decoder. In various aspects, the process (900) is executed by processing circuitry, such as the processing circuitry that performs functions of the video decoder (110), the processing circuitry that performs functions of the video decoder (210), and the like. In some aspects, the process (900) is implemented in software instructions, thus when the processing circuitry executes the software instructions, the processing circuitry performs the process (900). The process starts at (S901) and proceeds to (S910).

At (S910), a bitstream that includes coded information of a current block is received, the coded information of the current block indicates a state transition path of a state machine. The state transition path of the state machine includes at least a first state transition associated with a first quantization shifting offset of one or more first transform coefficients in transform coefficients of the current block.

At (S920), the first quantization shifting offset associated with the one or more first transform coefficients is determined according to the first state transition.

At (S930), the one or more first transform coefficients are determined based on the first quantization shifting offset.

At (S940), residuals in a spatial domain of the current block are calculated based on at least the one or more first transform coefficients.

At (S950), the current block is reconstructed according to the residuals in the spatial domain.

According to some aspects of the disclosure, the state transition path of the state machine includes a plurality of state transitions respectively associated with the transform coefficients of the current block, the first state transition is associated with a first transform coefficient in the transform coefficients. A dequantized value for the first transform coefficient is determined according to the first state transition of the state machine. The first transform coefficient is reconstructed according to the dequantized value and the first quantization shifting offset.

In some embodiments, the first quantization shifting offset is determined according to a function with the first state transition being input to the function. In an example, the function is a linear function of a result from a modulo operation on a previous state index of the first state transition based on a modulus of a positive integer.

In some embodiments, a sign of the first quantization shifting offset is determined according to the first state transition, an absolute value of the first quantization shifting offset is a predefined value or is decoded from the bitstream. In an example, the first quantization shifting offset is determined to have a first sign (e.g., positive) when a previous state index of the first state transition is smaller than a threshold value; and the first quantization shifting offset is determined to have a second sign (e.g., negative) when the previous state index of the first state transition is equal to or greater than the threshold value.

In another example, the first quantization shifting offset is determined to have a first sign when a previous state index of the first state transition is odd; and the first quantization shifting offset is determined to have a second sign when the previous state index of the first state transition is even.

In another example, the sign of the first quantization shifting offset is determined according to a lookup table that maps a previous state index of the first state transition to the sign.

In some embodiments, the first quantization shifting offset is selected from a quantization shifting offset candidate list based on the first state transition, the quantization shifting offset candidate list includes a plurality of candidates.

In an example, a first candidate is selected from the quantization shifting offset candidate list as the first quantization shifting offset when a previous state index of the first state transition is smaller than a threshold value; and a second candidate is selected from the quantization shifting offset candidate list as the first quantization shifting offset when the previous state index of the first state transition is equal to or greater than the threshold value.

In another example, a first candidate is selected from the quantization shifting offset candidate list as the first quantization shifting offset when a previous state index of the first state transition is odd; and a second candidate is selected from the quantization shifting offset candidate list as the first quantization shifting offset when the previous state index of the first state transition is even.

In another example, the first quantization shifting offset is selected from a quantization shifting offset candidate list according to a lookup table that maps a previous state index of the first state transition to a candidate in the quantization shifting offset candidate list.

In some examples, a signal indicative of the quantization shifting offset candidate list from a set of quantization shifting offset lists is decoded from the bitstream.

According to an aspect of the disclosure, the state machine is a second state machine, the state transition path is a first state transition path. In some examples, dequantized values for the transform coefficients are determined according to a second state transition path by a first state machine, the second state transition path by the first state machine includes a plurality of state transitions respectively associated with the transform coefficients. The one or more first transform coefficients are reconstructed based on the first quantization shifting offset and the dequantized values.

Then, the process proceeds to (S999) and terminates.

The process (900) can be suitably adapted. Step(s) in the process (900) can be modified and/or omitted. Additional step(s) can be added. Any suitable order of implementation can be used.

Figure 10:
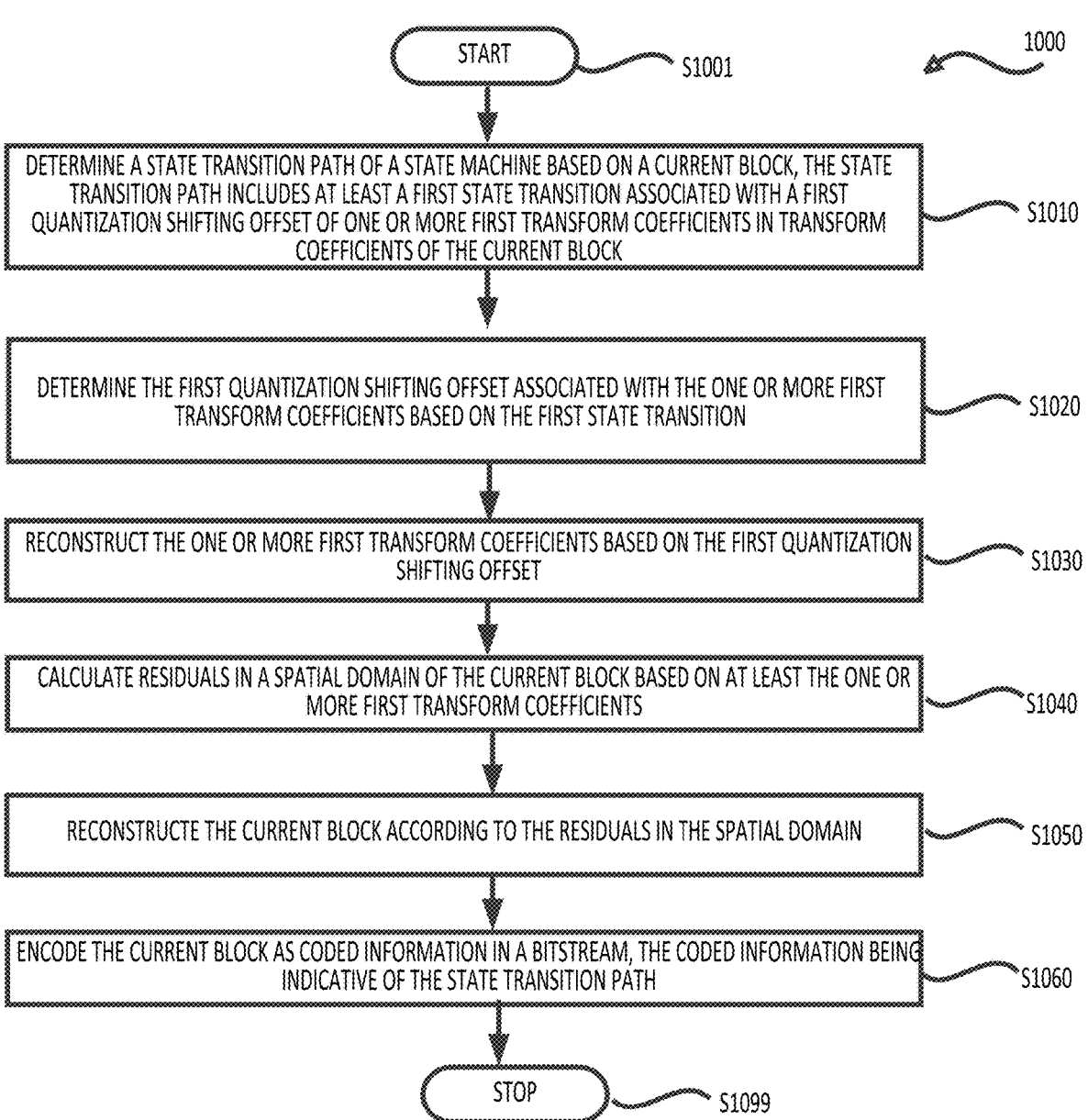
FIG. 10 shows a flow chart outlining an encoding process according to some aspects of the disclosure.

FIG. 10 shows a flow chart outlining a process (1000) according to an aspect of the disclosure. The process (1000) can be used in a video encoder. In various aspects, the process (1000) is executed by processing circuitry, such as the processing circuitry that performs functions of the video encoder (103), the processing circuitry that performs functions of the video encoder (303), and the like. In some examples, the process (1000) is implemented in software instructions, thus when the processing circuitry executes the software instructions, the processing circuitry performs the process (1000). The process starts at (S1001) and proceeds to (S1010).

At (S1010), a state transition path of a state machine is determined based on a current block, the state transition path includes at least a first state transition associated with a first quantization shifting offset of one or more first transform coefficients in transform coefficients of the current block. In an example, the first state transition is represented by a transition from a previous state (with a previous state index) to a current state (with a current state index).

At (S1020), the first quantization shifting offset associated with the one or more first transform coefficients is determined based on the first state transition.

At (S1030), the one or more first transform coefficients are reconstructed based on the first quantization shifting offset.

At (S1040), residuals in a spatial domain of the current block are calculated based on at least the one or more first transform coefficients.

At (S1050), the current block is reconstructed according to the residuals in the spatial domain.

At (S1060), the current block is encoded as coded information in a bitstream, the coded information is indicative of the state transition path.

According to an aspect of the disclosure, the state transition path of the state machine includes a plurality of state transitions respectively associated with quantized values of the transform coefficients, the first state transition is associated with a quantized value of a first transform coefficient in the transform coefficients. Further, a dequantized value for the first transform coefficient is determined according to the first state transition of the state machine. The first transform coefficient is reconstructed according to the dequantized value and the first quantization shifting offset.

In some examples, the first quantization shifting offset is based on a function with the first state transition being input to the function. In an example, the function is a linear function of a result from a modulo operation on a previous state index of the first state transition based on a modulus of a positive integer.

In some examples, a sign of the first quantization shifting offset is based on to the first state transition, an absolute value of the first quantization shifting offset being a predefined value or being decoded from the bitstream.

In an example, the first quantization shifting offset has a first sign when a previous state index of the first state transition is smaller than a threshold value; and the first quantization shifting offset has a second sign when the previous state index of the first state transition is equal to or greater than the threshold value.

In another example, the first quantization shifting offset has a first sign when a previous state index of the first state transition is odd; and the first quantization shifting offset has a second sign when the previous state index of the first state transition is even.

In another example, a lookup table maps a previous state index of the first state transition to the sign.

In some examples, the first quantization shifting offset is selected from a quantization shifting offset candidate list based on the first state transition, the quantization shifting offset candidate list comprising a plurality of candidates.

In an example, a first candidate is selected from the quantization shifting offset candidate list as the first quantization shifting offset when a previous state index of the first state transition is smaller than a threshold value; and a second candidate is selected from the quantization shifting offset candidate list as the first quantization shifting offset when the previous state index of the first state transition is equal to or greater than the threshold value.

In another example, a first candidate is selected from the quantization shifting offset candidate list as the first quantization shifting offset when a previous state index of the first state transition is odd; and a second candidate is selected from the quantization shifting offset candidate list as the first quantization shifting offset when the previous state index of the first state transition is even.

In another example, the first quantization shifting offset is selected from a quantization shifting offset candidate list according to a lookup table that maps a previous state index of the first state transition to a candidate in the quantization shifting offset candidate list.

In some examples, a signal indicative of the quantization shifting offset candidate list from a set of quantization shifting offset lists is encoded into the bitstream.

According to an aspect of the disclosure, the state machine is a second state machine, the state transition path is a first state transition path. Further, a second state transition path of a first state machine is determined based on the current block, the second state transition path includes a plurality of state transitions respectively associated with the transform coefficients of the current block. Dequantized values for the transform coefficients are determined according to the second state transition path by the first state machine. Then, the first state transition path of the second state machine is determined based on the dequantized values for the transform coefficients.

In some examples, to determine the first state transition path, accumulated reconstruction errors of a plurality of state transition paths of a trellis structure of the second state machine are calculated. Each of the plurality of state transition paths includes state transitions associated with the transform coefficients. A state transition associated with a transform coefficient determines a quantization shifting offset of the transform coefficient. The first state transition path is selected from the plurality of state transition paths when the first state transition path has a minimum accumulated reconstruction error. A signal indicative of the first state transition path is encoded in the coded information of the current block.

In some examples, the plurality of state transition paths include one or more predefined paths. In an example, the plurality of state transition paths include a path corresponding to no quantization shifting offset or zero quantization shifting offset for the transform coefficients.

In another example, the plurality of state transition paths include a path corresponding to a same quantization shift offset for all of the transform coefficients.

Then, the process proceeds to (S1099) and terminates.

The process (1000) can be suitably adapted. Step(s) in the process (1000) can be modified and/or omitted. Additional step(s) can be added. Any suitable order of implementation can be used.

According to an aspect of the disclosure, a method of processing visual media data is provided. In the method, a bitstream of visual media data is processed according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an example, the bitstream includes coded information of a current block, the coded information of the current block in a current picture indicates a state transition path of a state machine, the state transition path of the state machine includes at least a first state transition associated with a first quantization shifting offset of one or more first transform coefficients in transform coefficients of the current block. The format rule specifies that: the first quantization shifting offset associated with the one or more first transform coefficients is determined according to the first state transition; the one or more first transform coefficients are reconstructed based on the first quantization shifting offset; residuals in a spatial domain of the current block are calculated based on at least the one or more first transform coefficients; and the current block is reconstructed according to the residuals in the spatial domain.

The techniques described above, can be implemented as computer software using computer-readable instructions and physically stored in one or more computer-readable media. For example, FIG. 11 shows a computer system (1100) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
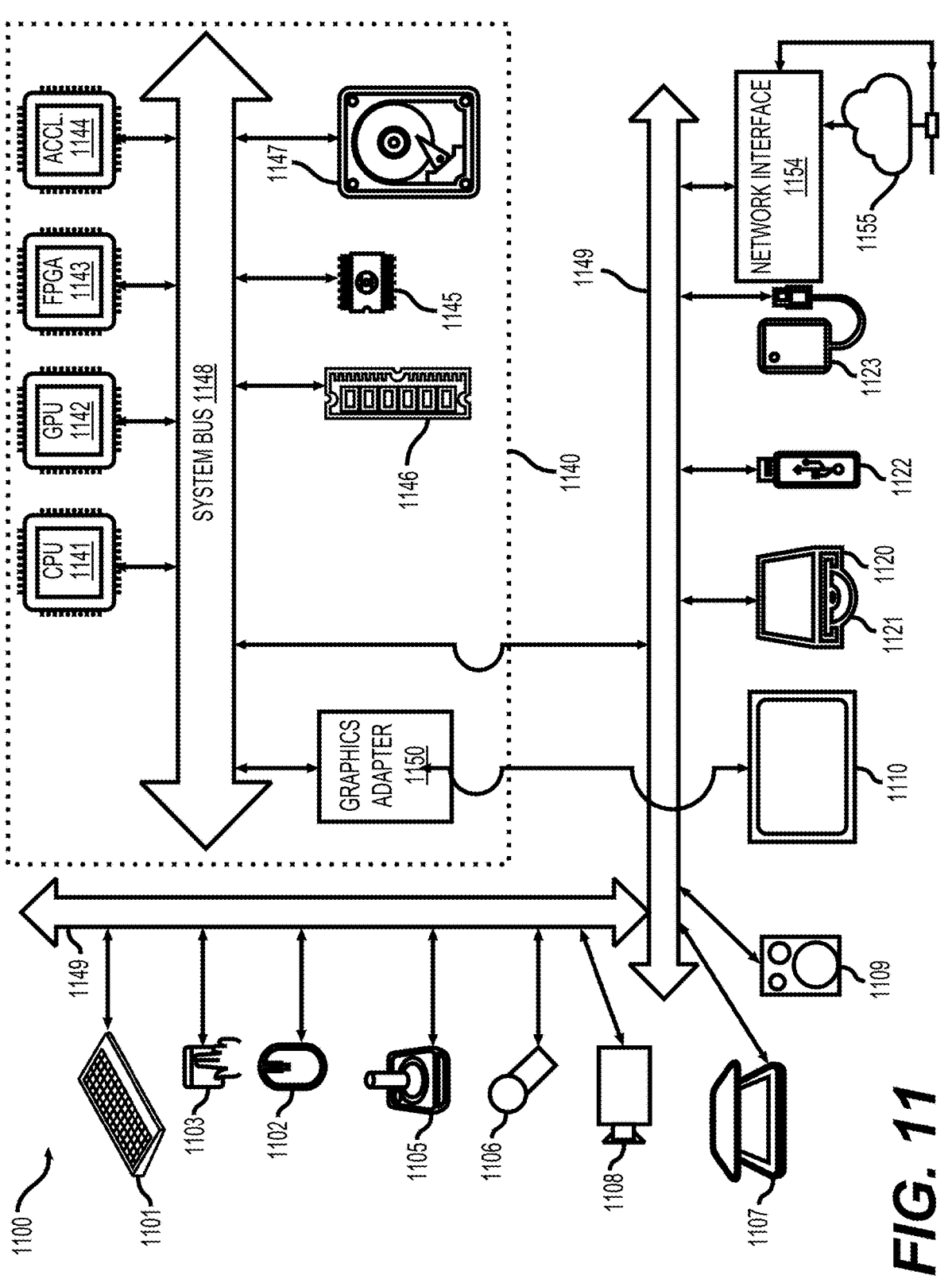
FIG. 11 is a schematic illustration of a computer system in accordance with an aspect.

The components shown in FIG. 11 for computer system (1100) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), graphics adapters (1150), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the screen (810) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various aspects of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method of video decoding, the method including: receiving a bitstream that comprises coded information of a current block, the coded information of the current block indicating a state transition path of a state machine, the state transition path of the state machine including at least a first state transition associated with a first quantization shifting offset of one or more first transform coefficients in transform coefficients of the current block; determining the first quantization shifting offset associated with the one or more first transform coefficients according to the first state transition; reconstructing the one or more first transform coefficients based on the first quantization shifting offset; calculating residuals in a spatial domain of the current block based on at least the one or more first transform coefficients; and reconstructing the current block according to the residuals in the spatial domain.

(2) The method of feature (1), in which the state transition path of the state machine comprises a plurality of state transitions respectively associated with the transform coefficients of the current block, the first state transition is associated with a first transform coefficient in the transform coefficients, the method includes determining a dequantized value for the first transform coefficient according to the first state transition of the state machine; and reconstructing the first transform coefficient according to the dequantized value and the first quantization shifting offset.

(3) The method of any of features (1) to (2), the method including: determining the first quantization shifting offset according to a function with the first state transition being input to the function (4) The method of any of features (1) to (3), in which the function is a linear function of a result from a modulo operation on a previous state index of the first state transition based on a modulus of a positive integer.

(5) The method of any of features (1) to (4), the method including: determining a sign of the first quantization shifting offset according to the first state transition, an absolute value of the first quantization shifting offset being a predefined value or being decoded from the bitstream.

(6) The method of any of features (1) to (5), the method including determining that the first quantization shifting offset has a first sign when a previous state index of the first state transition is smaller than a threshold value; and determining that the first quantization shifting offset has a second sign when the previous state index of the first state transition is equal to or greater than the threshold value.

(7) The method of any of features (1) to (6), the method including determining that the first quantization shifting offset has a first sign when a previous state index of the first state transition is odd; and determining that the first quantization shifting offset has a second sign when the previous state index of the first state transition is even (8) The method of any of features (1) to (7), the method including: determining the sign of the first quantization shifting offset according to a lookup table that maps a previous state index of the first state transition to the sign (9) The method of any of features (1) to (8), the method including: selecting the first quantization shifting offset from a quantization shifting offset candidate list based on the first state transition, the quantization shifting offset candidate list comprising a plurality of candidates

(10) The method of any of features (1) to (9), the method including: selecting a first candidate from the quantization shifting offset candidate list as the first quantization shifting offset when a previous state index of the first state transition is smaller than a threshold value; and selecting a second candidate from the quantization shifting offset candidate list as the first quantization shifting offset when the previous state index of the first state transition is equal to or greater than the threshold value

(11) The method of any of features (1) to (10), the method including: selecting a first candidate from the quantization shifting offset candidate list as the first quantization shifting offset when a previous state index of the first state transition is odd; and selecting a second candidate from the quantization shifting offset candidate list as the first quantization shifting offset when the previous state index of the first state transition is even.

(12) The method of any of features (1) to (11), the method including: selecting the first quantization shifting offset from a quantization shifting offset candidate list according to a lookup table that maps a previous state index of the first state transition to a candidate in the quantization shifting offset candidate list.

(13) The method of any of features (1) to (12), the method including: decoding a signal indicative of the quantization shifting offset candidate list from a set of quantization shifting offset lists.

(14) The method of any of features (1) to (13), in which the state machine is a second state machine, the state transition path is a first state transition path, the method includes: determining dequantized values for the transform coefficients according to a second state transition path by a first state machine, the second state transition path by the first state machine comprising a plurality of state transitions respectively associated with the transform coefficients; and reconstructing the one or more first transform coefficients based on the first quantization shifting offset and the dequantized values.

(15) A method of video encoding, the method including: determining a state transition path of a state machine based on a current block, the state transition path including at least a first state transition associated with a first quantization shifting offset of one or more first transform coefficients in transform coefficients of the current block; determining the first quantization shifting offset associated with the one or more first transform coefficients based on the first state transition; reconstructing the one or more first transform coefficients based on the first quantization shifting offset; calculating residuals in a spatial domain of the current block based on at least the one or more first transform coefficients; reconstructing the current block according to the residuals in the spatial domain; and encoding the current block as coded information in a bitstream, the coded information being indicative of the state transition path.

(16) The method of feature (15), in which the state transition path of the state machine comprises a plurality of state transitions respectively associated with quantized values of the transform coefficients, the first state transition is associated with a quantized value of a first transform coefficient in the transform coefficients, the method includes: determining a dequantized value for the first transform coefficient according to the first state transition of the state machine; and reconstructing the first transform coefficient according to the dequantized value and the first quantization shifting offset.

(17) The method of any of features (15) to (16), in which the first quantization shifting offset is based on a function with the first state transition being input to the function.

(18) The method of any of features (15) to (17), in which the function is a linear function of a result from a modulo operation on a previous state index of the first state transition based on a modulus of a positive integer.

(19) The method of any of features (15) to (18), in which a sign of the first quantization shifting offset is based on to the first state transition, an absolute value of the first quantization shifting offset being a predefined value or being decoded from the bitstream.

(20) The method of any of features (15) to (19), in which the first quantization shifting offset has a first sign when a previous state index of the first state transition is smaller than a threshold value; and the first quantization shifting offset has a second sign when the previous state index of the first state transition is equal to or greater than the threshold value.

(21) The method of any of features (15) to (20), in which the first quantization shifting offset has a first sign when a previous state index of the first state transition is odd; and the first quantization shifting offset has a second sign when the previous state index of the first state transition is even.

(22) The method of any of features (15) to (21), in which a lookup table maps a previous state index of the first state transition to the sign.

(23) The method of any of features (15) to (22), in which the first quantization shifting offset is selected from a quantization shifting offset candidate list based on the first state transition, the quantization shifting offset candidate list comprising a plurality of candidates.

(24) The method of any of features (15) to (23), in which a first candidate is selected from the quantization shifting offset candidate list as the first quantization shifting offset when a previous state index of the first state transition is smaller than a threshold value; and a second candidate is selected from the quantization shifting offset candidate list as the first quantization shifting offset when the previous state index of the first state transition is equal to or greater than the threshold value.

(25) The method of any of features (15) to (24), in which a first candidate is selected from the quantization shifting offset candidate list as the first quantization shifting offset when a previous state index of the first state transition is odd; and a second candidate is selected from the quantization shifting offset candidate list as the first quantization shifting offset when the previous state index of the first state transition is even.

(26) The method of any of features (15) to (25), in which the first quantization shifting offset is selected from a quantization shifting offset candidate list according to a lookup table that maps a previous state index of the first state transition to a candidate in the quantization shifting offset candidate list.

(27) The method of any of features (15) to (26), the method including: encoding a signal indicative of the quantization shifting offset candidate list from a set of quantization shifting offset lists.

(28) The method of any of features (15) to (27), in which the state machine is a second state machine, the state transition path is a first state transition path, the method includes: determining a second state transition path of a first state machine based on the current block, the second state transition path including a plurality of state transitions respectively associated with the transform coefficients of the current block; calculating dequantized values for the transform coefficients according to the second state transition path by the first state machine; and determining the first state transition path of the second state machine based on the dequantized values for the transform coefficients.

(29) The method of any of features (15) to (28), the method including: calculating accumulated reconstruction errors of a plurality of state transition paths of a trellis structure of the second state machine, each of the plurality of state transition paths including state transitions associated with the transform coefficients, a state transition associated with a transform coefficient determining a quantization shifting offset of the transform coefficient; selecting the first state transition path from the plurality of state transition paths when the first state transition path has a minimum accumulated reconstruction error; and encoding a signal indicative of the first state transition path in the coded information of the current block.

(30) The method of any of features (15) to (29), in which the plurality of state transition paths include one or more predefined paths.

(31) The method of any of features (15) to (30), in which the plurality of state transition paths include a path corresponding to zero quantization shifting offset for the transform coefficients.

(32) The method of any of features (15) to (31), in which the plurality of state transition paths include a path corresponding to a same quantization shift offset for the transform coefficients.

(33) A method of processing visual media data, the method including processing a bitstream of visual media data according to a format rule. The bitstream includes coded information of a current block, the coded information of the current block indicates a state transition path of a state machine, the state transition path of the state machine including at least a first state transition associated with a first quantization shifting offset of one or more first transform coefficients in transform coefficients of the current block. The format rule specifies that: the first quantization shifting offset associated with the one or more first transform coefficients is determined according to the first state transition; the one or more first transform coefficients are reconstructed based on the first quantization shifting offset; residuals in a spatial domain of the current block are calculated based on at least the one or more first transform coefficients; and the current block is reconstructed according to the residuals in the spatial domain.

(34) An apparatus for video decoding, including processing circuitry that is configured to perform the method of any of features (1) to (14).

(35) An apparatus for video encoding, including processing circuitry that is configured to perform the method of any of features (16) to (32).

(36) A non-transitory computer-readable storage medium storing instructions which when executed by at least one processor cause the at least one processor to perform the method of any of features (1) to (33).

What is claimed is:

1. A method of video decoding, comprising:
receiving a bitstream that comprises coded information of a current block, the coded information of the current block indicating a state transition path of a state machine, the state transition path of the state machine including at least a first state transition associated with a first quantization shifting offset of one or more first transform coefficients in transform coefficients of the current block;
determining the first quantization shifting offset associated with the one or more first transform coefficients according to the first state transition;
reconstructing the one or more first transform coefficients based on the first quantization shifting offset;
calculating residuals in a spatial domain of the current block based on at least the one or more first transform coefficients; and
reconstructing the current block according to the residuals in the spatial domain.

2. The method of claim 1, wherein the state transition path of the state machine comprises a plurality of state transitions respectively associated with the transform coefficients of the current block, the first state transition is associated with a first transform coefficient in the transform coefficients, the method comprises:
determining a dequantized value for the first transform coefficient according to the first state transition of the state machine; and
reconstructing the first transform coefficient according to the dequantized value and the first quantization shifting offset.

3. The method of claim 2, further comprising:
determining the first quantization shifting offset according to a function with the first state transition being input to the function.

4. The method of claim 3, wherein the function is a linear function of a result from a modulo operation on a previous state index of the first state transition based on a modulus of a positive integer.

5. The method of claim 2, further comprising:
determining a sign of the first quantization shifting offset according to the first state transition, an absolute value of the first quantization shifting offset being a predefined value or being decoded from the bitstream.

6. The method of claim 5, wherein the determining the sign further comprises:
determining that the first quantization shifting offset has a first sign when a previous state index of the first state transition is smaller than a threshold value; and
determining that the first quantization shifting offset has a second sign when the previous state index of the first state transition is equal to or greater than the threshold value.

7. The method of claim 5, wherein the determining the sign further comprises:
determining that the first quantization shifting offset has a first sign when a previous state index of the first state transition is odd; and
determining that the first quantization shifting offset has a second sign when the previous state index of the first state transition is even.

8. The method of claim 5, wherein the determining the sign further comprises:
determining the sign of the first quantization shifting offset according to a lookup table that maps a previous state index of the first state transition to the sign.

9. The method of claim 2, wherein further comprising:
selecting the first quantization shifting offset from a quantization shifting offset candidate list based on the first state transition, the quantization shifting offset candidate list comprising a plurality of candidates.

10. The method of claim 9, wherein the selecting further comprises:
selecting a first candidate from the quantization shifting offset candidate list as the first quantization shifting offset when a previous state index of the first state transition is smaller than a threshold value; and
selecting a second candidate from the quantization shifting offset candidate list as the first quantization shifting offset when the previous state index of the first state transition is equal to or greater than the threshold value.

11. The method of claim 9, wherein the selecting further comprises:

selecting a first candidate from the quantization shifting offset candidate list as the first quantization shifting offset when a previous state index of the first state transition is odd; and selecting a second candidate from the quantization shifting offset candidate list as the first quantization shifting offset when the previous state index of the first state transition is even.

12. The method of claim 9, wherein the selecting further comprises:

selecting the first quantization shifting offset from a quantization shifting offset candidate list according to a lookup table that maps a previous state index of the first state transition to a candidate in the quantization shifting offset candidate list.

13. The method of claim 9, further comprising:

decoding a signal indicative of the quantization shifting offset candidate list from a set of quantization shifting offset lists.

14. The method of claim 1, wherein the state machine is a second state machine, the state transition path is a first state transition path, the method comprises:

determining dequantized values for the transform coefficients according to a second state transition path by a first state machine, the second state transition path by the first state machine comprising a plurality of state transitions respectively associated with the transform coefficients; and reconstructing the one or more first transform coefficients based on the first quantization shifting offset and the dequantized values.

15. A method of video encoding, comprising:

determining a state transition path of a state machine based on a current block, the state transition path including at least a first state transition associated with a first quantization shifting offset of one or more first transform coefficients in transform coefficients of the current block;

determining the first quantization shifting offset associated with the one or more first transform coefficients based on the first state transition;

reconstructing the one or more first transform coefficients based on the first quantization shifting offset;

calculating residuals in a spatial domain of the current block based on at least the one or more first transform coefficients;

reconstructing the current block according to the residuals in the spatial domain; and encoding the current block as coded information in a bitstream, the coded information being indicative of the state transition path.

16. The method of claim 15, wherein the state transition path of the state machine comprises a plurality of state transitions respectively associated with quantized values of the transform coefficients, the first state transition is associated with a quantized value of a first transform coefficient in the transform coefficients, the method comprises:

determining a dequantized value for the first transform coefficient according to the first state transition of the state machine; and reconstructing the first transform coefficient according to the dequantized value and the first quantization shifting offset.

17. The method of claim 15, wherein the state machine is a second state machine, the state transition path is a first state transition path, the method comprises:

determining a second state transition path of a first state machine based on the current block, the second state transition path including a plurality of state transitions respectively associated with the transform coefficients of the current block;

calculating dequantized values for the transform coefficients according to the second state transition path by the first state machine; and determining the first state transition path of the second state machine based on the dequantized values for the transform coefficients.

18. The method of claim 17, wherein the determining the first state transition path, the method comprises:

calculating accumulated reconstruction errors of a plurality of state transition paths of a trellis structure of the second state machine, each of the plurality of state transition paths including state transitions associated with the transform coefficients, a state transition associated with a transform coefficient determining a quantization shifting offset of the transform coefficient;

selecting the first state transition path from the plurality of state transition paths when the first state transition path has a minimum accumulated reconstruction error; and encoding a signal indicative of the first state transition path in the coded information of the current block.

19. The method of claim 18, wherein the plurality of state transition paths include one or more predefined paths.

20. A non-transitory computer-readable storage medium storing instructions which when executed by a processor cause the processor to perform a method of encoding a bitstream comprising:

determining a state transition path of a state machine based on a current block, the state transition path including at least a first state transition associated with a first quantization shifting offset of one or more first transform coefficients in transform coefficients of the current block;

determining the first quantization shifting offset associated with the one or more first transform coefficients based on the first state transition;

reconstructing the one or more first transform coefficients based on the first quantization shifting offset;

calculating residuals in a spatial domain of the current block based on at least the one or more first transform coefficients;

reconstructing the current block according to the residuals in the spatial domain;

encoding the current block as coded information in a bitstream, the coded information being indicative of the state transition path; and transmitting the bitstream.

* * * * *